June 14, 1938. C. J. OXFORD ET AL 2,120,623
ROTARY TOOL
Filed Sept. 21, 1936
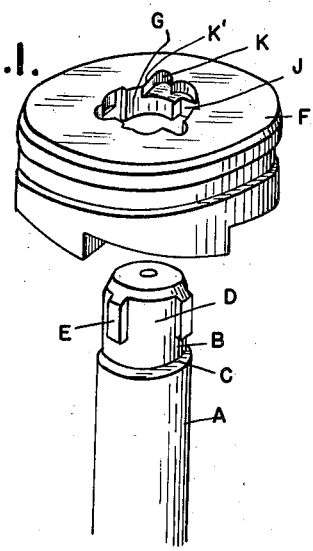
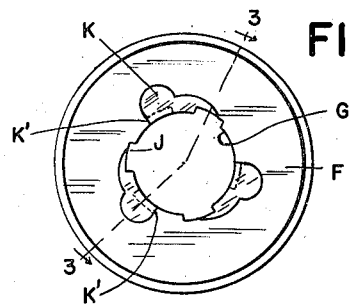
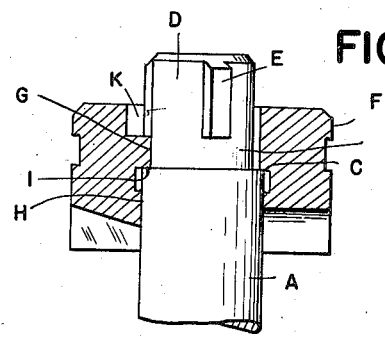
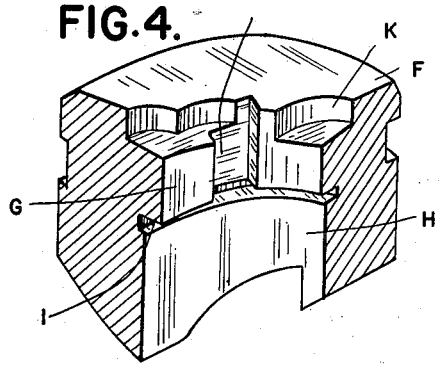
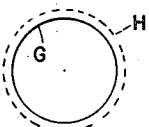
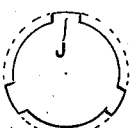
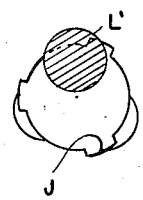
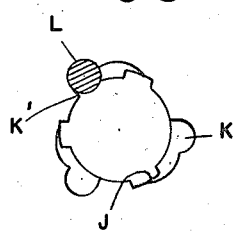
INVENTORS
CARL J. OXFORD
JOHN NELSON
BY
ATTORNEYS Patented June 14, 1938

2,120,623

UNITED STATES PATENT OFFICE 2,120,623

ROTARY TOOL

Carl J. Oxford, Detroit, and John Nelson, Berkley, Mich., assignors to National Twist Drill & Tool Company, Detroit, Mich., a corporation of Michigan Application September 21, 1936, Serial No. 101,858

4 Claims. (Cl. 279—1)

The invention relates to rotary tools more particularly designed for use as counterboring tools and of that type in which the tool proper is readily attached to and detachable from its driving shank. It is the object of the invention to obtain a construction in which the tool when engaged with the shank will be accurately aligned therewith; further, a construction in which the driving torque is transmitted from the shank to the tool through substantially radially extending abutting faces on the respective member; further, in providing a plurality of these driving faces which are distributed about the tool and which are so accurately positioned that all of the cooperating faces will be simultaneously in engagement; and further a construction which permits of easy engagement and disengagement. It is also an object of the invention to obtain a construction that can be easily manufactured at comparatively low cost. With these objects in view, the invention consists: first, in the peculiar construction of the tool; and second, in the method of manufacturing the same as hereinafter set forth.

In the drawing:

Figure 1 is a perspective view of the tool and its shank in alignment with each other ready for engagement;

Figure 2 is an end elevation of the tool engaged with its shank;

Figure 3 is a cross section on line 3—3 of Figure 2;

Figure 4 is an enlarged sectional perspective view of a portion of the tool;

Figures 5, 6, 7 and 8 are diagrammatic end elevations illustrating the method of manufacture.

As illustrated A is the driving shank the end portion of which is provided with an annular groove B forming a shoulder C between the same and the body of the shank. Beyond the groove B the shank is provided with a plurality of longitudinally extending recesses D leaving therebetween a series of splines E having substantially radially extending shoulders. Preferably, there are three of these splines equally spaced about the shank and the recesses D therebetween have their bottoms flush with the bottom of the annular groove B to form segments of a cylinder. F is the tool which, as shown, is in the form of an end mill having an axial cylindrical bore G of a radius corresponding to that of the segments D. It is further provided with a counterbore H corresponding in diameter to the body of the shank A and having a shoulder I for abutting against the shoulder C. To permit of engaging the shank with the tool, spline ways J are formed, preferably by broaching in the portion G, and these correspond in width and in relative position to the splines E. The length of the portion G from the shoulder I to the end of the tool is greater than the width of the annular groove B, so that the splines E will not pass completely through the spline ways. The end of the tool is then provided with recesses K which intersect the respective spline ways and which permit the inner ends of the splines E to engage the bottoms of these recesses. This also permits of the partial rotation of the shank so as to interlock the same with the tool, while torque will be transmitted from the splines to the walls of the recesses K. Thus if these walls are accurately positioned in relation to the spline ways J all of the splines will simultaneously contact therewith and will cooperate in the transmission of the torque.

In the manufacture of the tool as thus far described, it will be obvious that the groove B can be readily turned in the shank A and that the recesses D may be formed by milling. Also, in the forming of the tool F it may be easily bored and counterbored to form the portions G and H; the spline ways J can be formed by broaching, while the recesses K can be formed by milling. For the latter operation we preferably employ a mill of relatively small diameter so that by moving it radially as indcated at L, Figure 8, it will form a recess having a straight shoulder K' for engaging the spline E. This shoulder K' can also be very accurately located with respect to the spline way J and, therefore, all of the splines will simultaneously contact with their corresponding shoulders. However, to avoid unnecessarily cutting away the end of the tool G, the diameter of the mill is restricted which necessitates a second cut, as indicated at L', to provide a clear passage for the spline when rotated from the spline way to the shoulder K'. This second cut L' may be formed either prior or subsequent to the cut indicated at L which forms the shoulder K'. Figures 5 to 8 show the successive operations in the forming of the tool: Figure 5 showing the bore G and counterbore H in dotted lines; Figure 6 illustrates the forming of the spline ways J; and Figures 7 and 8 the operations of forming the intersecting cuts L' and L which together form the recesses K. All of these steps are simple mechanical operations so that the cost of manufacture is comparatively small.

In use, in forming a counterbore the shank A is first inserted through the main bore with its end portion projecting. The tool F can then be sleeved upon the shank and given a slight rotation to hold it from detachment and to bring the splines J against the shoulders K'.

What we claim as our invention is:

1. A rotary tool having an axial bore and counterbore forming co-axial cylindrical walls of different diameters extending respectively to the opposite ends of the tool and with an annular shoulder therebetween, the portion of smaller diameter having a spline way extending longitudinally therethrough and the outer end of said portion being recessed to intersect with said spline way and to form a substantially radial shoulder in predetermined relation thereto; in combination with a driving shank for fitting said large diameter portion, said shank being cut away at its end to form a segmental cylindrical portion for fitting said small diameter portion leaving a spline for fitting said spline way and with a shoulder for engaging said annular shoulder, said spline being cut away to leave a space between the same and said shoulder corresponding in length to the space between said annular shoulder and recess, whereby after insertion in said tool said shank may be rotated to engage said spline with said substantially radial shoulder.

2. A rotary tool having an axial bore and counterbore forming co-axial cylindrical portions of different diameters extending respectively to the opposite ends of the tool and with an annular shoulder therebetween, the portion of small diameter having a plurality of spline ways extending longitudinally therethrough and the outer end of said portion having recesses therein intersecting the respective spline ways and forming substantially radial shoulders in predetermined relation thereto; in combination with a driving shank for fitting said large diameter portion, the end portion of said shank being cut away to form a plurality of segmental portions for fitting said small diameter portion leaving therebetween splines positioned to engage said spline ways, and a shoulder for engaging said annular shoulder, said splines being cut away to form spaces between the same and said shoulder corresponding to the length between said annular shoulder and recesses of the tool, whereby said shank after insertion may be rotated to simultaneously engage all of said splines with the corresponding substantially radial faces of the tool for transmitting torque thereto and for also holding the tool from axial displacement.

3. A rotary member having an axial bore therethrough from one end thereof and a counterbore from the opposite end forming co-axial cylindrical portions of different diameters with an annular shoulder therebetween, said portion of smaller diameter having a spline way extending therethrough and the outer end of said portion being provided with a recess therein intersecting said spline way and forming a radially extending shoulder a predetermined distance from said spline way, and the bottom of said recess being parallel to and a predetermined distance from said annular shoulder.

4. A rotary member having an axial bore therethrough from one end thereof and a counterbore from the opposite end forming co-axial cylindrical portions of different diameters with an annular shoulder therebetween, said portion of smaller diameter having a plurality of spaced spline ways extending longitudinally therethrough and the outer end of said portion having a plurality of recesses therein each intersecting one of said spline ways and forming a radially extending shoulder a predetermined distance therefrom, the bottom of each recess being parallel to and a predetermined distance from said annular shoulder.

CARL J. OXFORD.
JOHN NELSON.